United States Patent [19]

Schuma

[11] Patent Number: 5,402,227
[45] Date of Patent: Mar. 28, 1995

[54] HIGH RESOLUTION MULTIPLE CHANNEL IMAGING SPECTROMETER

[75] Inventor: Richard F. Schuma, Fort Wayne, Ind.

[73] Assignee: ITT Corporation, New York, N.Y.

[21] Appl. No.: 285,878

[22] Filed: Aug. 4, 1994

Related U.S. Application Data

[63] Continuation of Ser. No. 19,028, Feb. 18, 1993, abandoned.

[51] Int. Cl.⁶ .............................................. G01J 3/30
[52] U.S. Cl. ..................................... 356/328; 356/330
[58] Field of Search ........ 356/328, 333, 334, 330–332, 356/326

[56] References Cited

U.S. PATENT DOCUMENTS

| | | | |
|---|---|---|---|
| 3,728,029 | 4/1973 | Hirschfeld | 356/332 |
| 4,049,353 | 9/1977 | Missio | 356/326 |
| 4,095,899 | 6/1978 | Vanasse | 356/346 |
| 4,325,635 | 4/1982 | Sattler et al. | 356/349 |
| 4,736,360 | 4/1988 | McMahon | 359/130 |
| 5,068,534 | 11/1991 | Bradshaw et al. | 250/288 |
| 5,149,959 | 9/1992 | Collins et al. | 356/328 |
| 5,159,199 | 10/1992 | LaBaw | 356/328 |
| 5,223,715 | 6/1993 | Taylor | 356/319 |
| 5,257,085 | 10/1993 | Ulich et al. | 356/301 |
| 5,260,767 | 11/1993 | Cook | 356/328 |

*Primary Examiner*—Rolf Hille
*Assistant Examiner*—Alexander Oscar Williams
*Attorney, Agent, or Firm*—Arthur L. Plevy; Patrick M. Hogan

[57] ABSTRACT

A high resolution multiple channel imaging spectrometer employing a pair of reflective gratings to create and separate, respectively, a spectrum of discrete spectral channels having high throughput and good channel isolation.

24 Claims, 1 Drawing Sheet

HIGH RESOLUTION MULTIPLE CHANNEL IMAGING SPECTROMETER

This is a continuation application under 37 C.F.R. 1.62 of prior Ser. No. 08/019,028, filed on Feb. 18, 1993, now abandoned, which is entitled HIGH RESOLUTION MULTIPLE CHANNEL IMAGING SPECTROMETER.

FIELD OF THE INVENTION

This invention relates to an imaging spectrometer, and more particularly to a high resolution multiple channel imaging spectrometer which employs a pair of reflective gratings each having an associated collimating lens to obtain a high optical throughput and to minimize crosstalk between the channels.

BACKGROUND OF THE INVENTION

An imaging spectrometer is an optical device for measuring the radiation from a radiant energy source as a function of wavelength. Conventional spectrometers consist of an objective lens or scan mirror which collects the radiation from the source and images it, by means of optical components onto the surface of a detector capable of converting the incident radiation into electrical signals.

Conventional spectrometers are used on photoreconnaissance satellites to photograph images from space. The scan mirror, which looks out into space from the satellite platform, rotates to scan and thus attain an image of the radiant energy source of interest. The scan mirror reflects this radiant energy onto the telescopic mirrors of the spectrometer from which the radiation is then passed through beamsplitters and filters to a detector where it is converted into electrical signals. Such spectrometers can be used for optical sensing of the earth. See an article by A. F. H. Goetz et al., *Optical Remote Sensing of the Earth*, Proceedings of the IEEE, at pp. 966, June 1985.

Conventional imaging spectrometers generally use thin film dichroic beamsplitters and bandpass filters to form the spectral channels of the spectrometer. Relay and focusing lenses are required in each channel to provide means for optimizing performance by maximizing throughput and achieving channel-to-channel coregistration. As the number of channels of a spectrometer increases the array of lenses, beamsplitters and filters that form the channels becomes increasingly complex. These optical elements must be critically aligned with one another within a channel and to an external reference to satisfy performance and coregistration requirements. The optical and mechanical tolerances of these elements must also be tightly controlled to assure that system performance requirements are met. Such spectrometers are typically limited to imaging radiation in the visible and the infrared (IR) regions of light where high spectral resolution is not required, and are unable to image radiation from the ultraviolet (UV) region of light where high spectral resolution is required.

The drawback with conventional spectrometers is that the thin film dichroic beamsplitters and the bandpass filters limit the number of channels which can be formed within a given spectral band because as the number of channels increases, optical crosstalk increases and throughput decreases. In addition, the number of man hours required for aligning and maintaining the optical components may become excessive due to the necessity of critically aligning and focusing the optical components within each channel so as to satisfy system performance requirements while compensating for manufacturing errors that tend to degrade performance. Alignment and focusing of the optical components in one channel affects all of the other channels. The alignment process is interactive, slowly convergent, and may vary from instrument to instrument, making scheduled and required labor hours difficult to estimate. Moreover, serious design difficulties are encountered with conventional spectrometers used in the UV region because the selection of optical materials suitable for beamsplitters and filters at such wavelengths is highly limited.

It is, therefore, an object or this invention to provide a UV imaging spectrometer which eliminates the problems of increased crosstalk and decreased throughput associated with conventional spectrometers, and which is easier to maintain then conventional spectrometers.

SUMMARY OF THE INVENTION

A high resolution multiple channel imaging spectrometer employing a pair of reflective gratings to create and separate, respectively, a spectrum of discrete spectral channels having high throughput and good channel isolation. Each reflective grating having an associated collimating lens for maximizing channel throughput, providing sharp spectral channels and reducing crosstalk between the channels.

DETAILED DESCRIPTION OF THE FIGURES

Figure 1:
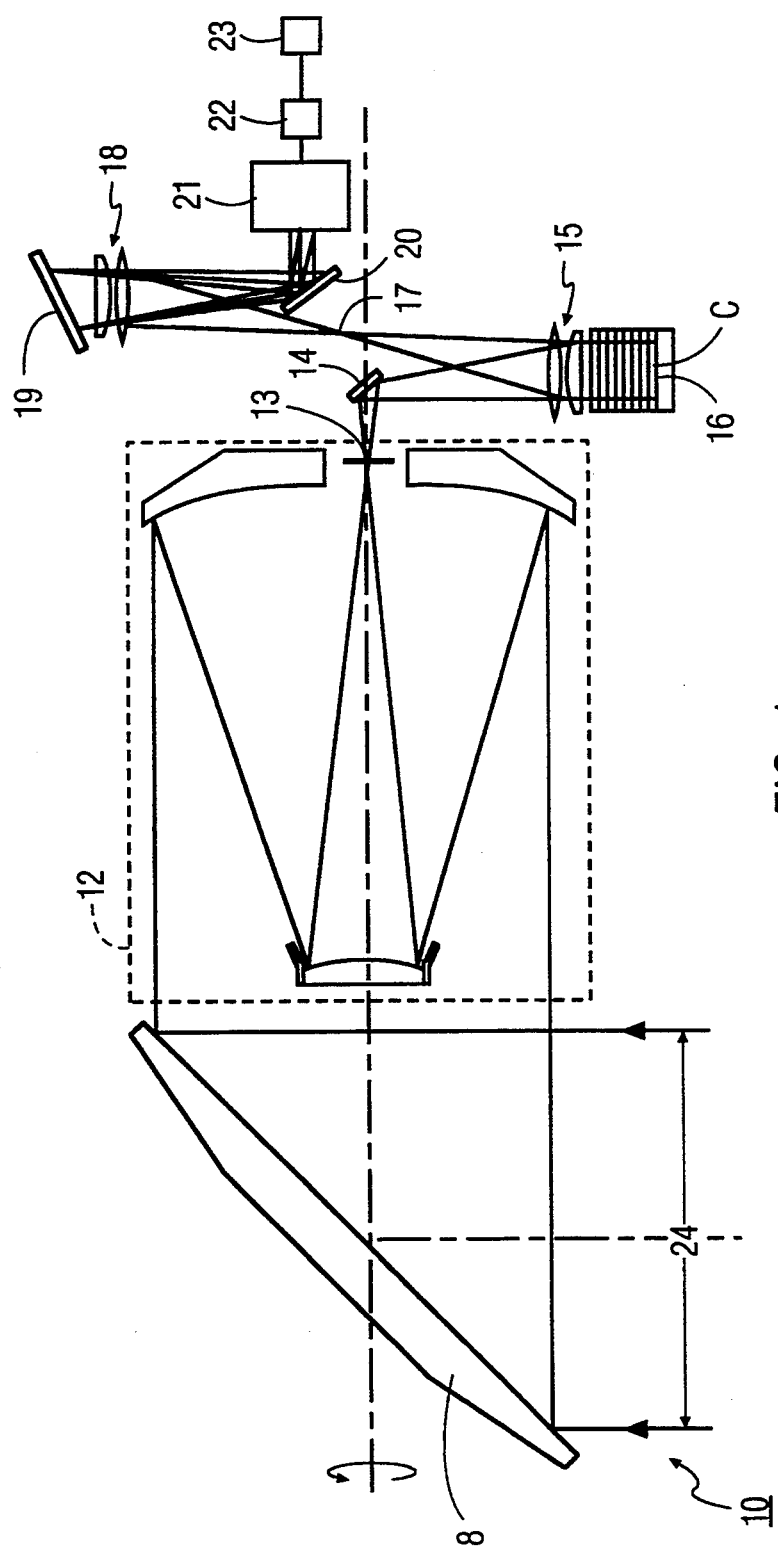
Referring to FIG. 1 there is shown an exemplary embodiment of the imaging spectrometer which is the object of this invention.

Referring to FIG. 1 there is shown a High Resolution Multiple Channel Imaging UV Spectrometer (spectrometer) 10 which is the object of the present invention. The spectrometer 10 includes a scan mirror 11, a telescope 12 having a first field stop 13, a first reflective surface 14, a first collimating lens 15, a blazed reflection echelon 16, a second field stop 17 associated with the blazed reflection echelon 16, a second collimating lens 18, a blazed reflection grating cross-disperser 19, a second reflective surface 20, an image intensifier tube 21 for converting UV radiation to visible light, a silicon detector 22 and electronics 23 associated with the detector 22 for processing the electrical signal from the detector 21.

The key elements of the spectrometer 10 described herein are the blazed reflection echelon 16 and the blazed reflection grating cross-disperser 19. These two elements overcome the aforementioned difficulties associated with conventional spectrometers. The blazed reflection echelon 16 is a coarse grating that forms a spectrum of the light contained within the instantaneous field-of-view (IFOV) of the telescope 12. The IFOV is defined by the first field stop 13 located at the focus of the telescope 12. The spectrum formed by the blazed reflection echelon 16 is imaged at the second field stop 17 by the first collimating lens 15 which is associated with the blazed reflection echelon 16.

Blazed grating are well known. See for example an article which appeared in the Applied Physics Letters, Vol. 29(5): 303, September 1976 by T. Aoyagi et al. and entitled HIGH EffICIENCY BLAZE GRATING COUPLERS. For examples of gratings as well as various optical devices employing gratings, see a text entitled OPTICAL INTEGRATED CIRCUITS by Hiroshi Naishihara et al., published by the McGraw Hill Book Co. (1989). In chapter four of the Naishihara text, there is discussed the theory of gratings and waveguide structures. Almost all modern gratings are blazed, or ruled with such line shape as to throw a large fraction of the incident radiation into one general direction, or for a given wavelength, into one order. Blazing was utilized by many prior art researchers and the blazed gratings were designed and developed for infrared spectroscopy and are called echelettes. Thus, the prior art was developed by iterative grinding and polishing a coarse blazed grating known as the echelle, with a spacing on the order of hundreds of wavelengths, that can obtain very high resolution through working in an order intermediate between those ordinarily used in a grating and those used in an echelon. The echelle usually requires a dispersion to avoid overlapping of orders. The echelette and the echelle are intermediate in their properties between the ordinary grating and the echelon.

Recognizing that the expression for the resolving power of a grating is symmetric to the order number and the number of lines, prior art investigators produced a transmission model of an instrument called an echelon. The echelon consisted of 20 plane-parallel plates, about 1 cm thick, from the same original glass sheet, each extending beyond its next neighbor on one side by a millimeter or so; the resolving power obtainable is on the order of $10^6$. Echelons have been constructed but are not widely employed. See a text entitled HANDBOOK OF PHYSICS by Condon and Odishaw second edition, published by McGraw Hill Book Co. (1958), chapter 6 entitled OPTICS. There are presently other techniques for providing echelons.

When the blazed reflection echelon 16 operates at a high spectral order number, the dispersion is large and the spectral separation between any two adjoining spectral orders, which is the free spectral range (FSR), is small. Therefore, the spectrum at the second field stop 17 is formed as a series of overlapping spectra whose central wavelengths occur at precisely the same diffraction angle. The central wavelengths are concentric with the second field stop 17. Each of these spectra corresponds to a specific order number and to a specific spectral channel of the spectrometer 10. Each spectral order is dedicated to one channel. Each spectral order corresponds to light of a different wavelength. See Table 1 below. The angle of incidence of the incoming light within the IFOV, the groove width of the blazed reflection echelon 16, the diameter of the second field stop 17, and the spectral order number define the bandwidth and the central wavelength of each spectral channel of the spectrometer 10. The FSR must be larger than the diameter of the second field stop 17 in order to define an unambiguous spectral band and to thus prevent channel-to-channel crosstalk.

A high spectral order number improves the design flexibility of the spectrometer 10 by permitting each channel to be tailored to a desired wavelength and bandwidth. Minimal spherical aberration in the first collimating lens 15 achieves a steep bandpass profile and further decreases crosstalk between the channels. Operating the blazed reflection echelon 16 in collimated light and at the blaze angle (the angle at which constructive interference equals the direction of specular reflection) achieves a high optical throughput that is not achievable with the thin film interference filters used in conventional spectrometers. The optical components associated with the blazed reflection echelon 16 are common to all of the channels of the spectrometer 10, thereby simplifying the assembly and the alignment of such components. In addition, a compact design is achieved by orienting the blazed reflection echelon 16 in a Littrow configuration wherein the blaze angle, the angle of constructive interference, and the angle of incidence at the echelon 16 are all equal.

Separation of the overlapping spectral orders forms the discrete channels of the spectrometer 10. This is accomplished by the blazed reflection grating cross-disperser 19 which operates to preclude spectral ambiguity in any given channel. Adequate dispersion is required to spatially separate the orders from one another so that only one order is focused on each detector element of the detector 22. Each detector element of the detector 22 is dedicated to a particularchannel. The dispersion requirement for the blazed reflection grating cross-disperser 19 is satisfied by the grating of the cross-disperser 19 having a small grating constant. The grating of the blazed reflection grating cross-disperser 19 must be holographically formed to eliminate periodic errors which might cause the formation of ghost images, thereby enabling the channels to be spectrally isolated from one another and enabling the channels of the spectrometer 10 to have a high optical throughput.

To maintain the compactness achieved with the operation of the blazed reflection echelon 16 as described herein, the blazed reflection grating cross-disperser 19 must also operate at the blaze angle and in a Littrow configuration. This provides an in-line echelon-cross-disperser configuration as shown in FIG. 1. Such a configuration can be supported on a conventional satellite platform to assure that both the blazed reflection echelon 16 and the blazed reflection grating cross-disperser 19 are positioned at correct spacing and angular orientations to one another under all conditions. This is required to maintain a high optical throughput and spectral bandpass stability in each channel of the spectrometer 10. The use of the second field stop 17 which is common to all channels, assures precise channel-to-channel coregistration under all conditions.

The spectrometer 10 operates as follows. The scan mirror 11, which is located in front of the telescope 12, rotates at a constant rate to provide linear scans across the UV scene which is to be imaged. Each revolution of the scan mirror 11 generates a single scan line. Two successive scan lines are contiguous when the IFOV and the scan rate across the radiation to be imaged are properly matched. Multifaceted scanners may be used to provide higher scan efficiencies. The UV radiation through the entrance aperture 24 is reflected from the scan mirror 11 onto the telescope 12 where it is imaged at the first field stop 13 which defines the IFOV. The UV radiation through 24 is directed through the first field stop 13 is reflected by the first reflective surface 14 to the first collimating lens 15. The UV radiation through 24 is shaped into a plane wavefront by the first collimating lens 15 and is focused onto the blazed reflection echelon 16 which creates the spectrum of overlapping spectral orders. This spectrum is then reimaged at the second field stop 17 after being reflected from the blazed reflection echelon 16. The first field stop 13 and the second field stop 17 are conjugate to one another. Ten (10) overlapping spectral orders are formed at the second field stop 17 within the 300 to 316 nm UV band. See Table 1 below. Field stop 17 defines the bandpass of each of the channels. Each spectral order (178 to 187) is dedicated to one UV channel. In order to achieve the aforementioned performance parameters, the blazed reflection echelon 16 should typically have a grating constant C of 30 micrometers and a blaze angel of 70 degrees. The first collimating lens 15 is designed for minimum spherical aberration to define sharp fall-off characteristics of the spectral passband and to preclude crosstalk with adjacent channels.

TABLE 1

SPECTRAL BANDS

| Spectral Order (number) | λ MIN (nm) | λ MAX (nm) |
|---|---|---|
| 187 | 300.0 | 300.8 |
| 186 | 301.6 | 302.4 |
| 185 | 303.2 | 304.1 |
| 184 | 304.9 | 305.7 |
| 183 | 306.6 | 307.4 |
| 182 | 308.2 | 309.1 |
| 181 | 309.9 | 310.8 |
| 180 | 311.7 | 312.5 |
| 179 | 313.4 | 314.2 |
| 178 | 315.2 | 316.0 |

The UV radiation 24 is directed through the second field stop 17 is recollimated to a plane wavefront by the second collimating lens 18. This wavefront is focused onto the blazed reflection grating cross-disperser 19 which separates the overlapping spectral orders. The UV radiation 23 is then reflected from the blazed reflection grating cross-disperser 19 onto the second reflective surface 20 from where each order forming the spectrum is imaged onto the particular one of the ten detector elements of detector 22 corresponding to that order. The image intensifier tube in combination with the detector converts the radiation into electrical signals. In order to separate the UV spectral orders, the grating cross-disperser 18 should typically have 4200 grooves/mm and a blaze angle of 39 degrees. High throughput of the spectrometer 10 is achieved by operating at the blaze angle of the blazed echelon 16 and the blazed grating cross-disperser 19.

The spectrometer 10 which is the object of this invention can be used for the following purposes: multispectral imaging of land, water and clouds; remote measurements of vertical temperature—altitude profile of the atmosphere; remote measurements of precipitable water by simultaneously sensing numerous H2O bands; surface spectral radiance measurements; high resolution absorption band profile measurements in the UV, visible and IR spectral regions; multispectral optical intelligence data collection; spectral emission profile measurement of manmade and naturaltargets; multispectral-laser intercept receiver;, remote measurements of UV atmospheric effects on hypervelocity missiles and projectiles; measurement of the total ozone concentration in the atmosphere; high resolution measurements of the profiles of $SO_2$, $CO_2$, $HO_2$, $N_2O$, $CO$, $CH_4$, $O_2$, $HDO$ and $O_3$ in the atmosphere absorption bands; and simultaneous measurements of numerous absorption bands for various atmospheric constituents.

It will be understood that the embodiment described herein, including the specific spectral order numbers and corresponding wavelengths discussed and the characteristics given for the blazed reflection echelon and the blazed reflection grating cross-disperser, is merely exemplary and that a person skilled in the art may make many variation sand modifications to the described embodiment utilizing functionally equivalent elements to those described. While the embodiment described herein is for UV light, this invention is equally applicable for visible and IR light. Any variations or modifications to the invention just described are intended to be included within the scope of said invention as defined by the appended claims.

We claim:

1. An improved high resolution spectrometer for generating multiple spectral channels from a source of radiant energy directed along the optical path of said spectrometer, the improvement in combination therewith, comprising:

a blazed echelon located in said optical path onto which said radiant energy is focused, wherein said blazed echelon creates a plurality of overlapping spectra from said radiant energy as said radiant energy reflects from said blazed echelon;

a single blazed grating disperser located in said optical path onto which impinges said plurality of overlapping spectra reflected from said blazed echelon, wherein said blazed grating disperser separates said overlapping spectra into discrete spectral channels; and a plurality of detecting means positioned to receive said discrete spectral channels emanating from said blazed grating disperser, each of said plurality of detecting means being adapted to detect one of said discrete spectral channels, wherein said single blazed grating disperser directs each of said discrete spectral channels toward the detecting means adapted to detect that spectral channel.

2. The spectrometer according to claim 1, wherein said blazed echelon has grooves with a first grating constant and said blazed grating disperser has a second grating constant that is less than said first grating constant of said blazed echelon.

3. The spectrometer according to claim 1, wherein said blazed grating disperser is holographically formed wherein said second grating constant is sized to eliminate periodic errors, thereby precluding the formation of ghost images and spectrally isolating said spectral channels to enable said spectrometer to have a high optical throughput.

4. The spectrometer according to claim 1, wherein each of said overlapping spectra corresponds to a specific spectral order number and a specific spectral channel.

5. The spectrometer according to claim 1, wherein said plurality of detecting means are silicon based.

6. The spectrometer according to claim 1, further including a first collimating lens assembly for focusing said radiant energy onto said blazed echelon and a second collimating lens assembly for focusing said spectrum of overlapping spectra onto said blazed grating disperser, said first collimating lens and said second collimating lens having minimal spherical aberrations, thereby achieving a steep bandpass profile and decreasing crosstalk between said spectral channels.

7. The spectrometer according to claim 6, wherein said spectrometer is an imaging spectrometer further including a scan mirror and a telescope, whereby said radiant energy is reflected from said scan mirror, passed through said telescope and directed toward said first collimating lens.

8. The spectrometer according to claim 1, wherein the blaze angle, the angle of constructive interference and the angle of incidence associated with said blazed echelon are substantially equal, thereby achieving a compact design.

9. The spectrometer according to claim 1, wherein said blazed echelon and said blazed grating disperser are common to all of said spectral channels.

10. The spectrometer according to claim 1, wherein said radiant energy is UV light.

11. The spectrometer according to claim 1, wherein said radiant energy is IR light.

12. The spectrometer according to claim 1, wherein said radiant energy is visible light.

13. An improved high resolution spectrometer for generating multiple spectral channels from a source of radiant energy directed along the optical path of said spectrometer, the improvement in combination therewith comprising:
   a single blazed echelon located in said optical path for forming a spectrum of overlapping spectra from said radiant energy, wherein said blazed echelon has grooves fabricated from a coarse material and wherein each one of said spectra corresponds to a specific spectral order number and a specific spectral channel;
   a single blazed grating disperser located in said optical path for separating said overlapping spectra into discrete spectral channels, said blazed grating disperser being holographically formed having a predetermined grating constant to eliminate periodic errors, thereby precluding the formation of ghost images and spectrally isolating said spectral channels to enable said spectrometer to have a high optical throughput; and
   a silicon detector having an array of detector elements, each one of said detector elements being adapted to detect a corresponding-one of said discrete spectral channels, each one of said discrete spectral channels of said radiant energy being reflected from said single blazed grating dispenser to the detector elements adapted to detect that spectral channel.

14. The spectrometer according to claim 13, further including a first collimating lens for directing said radiant energy onto said blazed echelon and a second collimating lens for directing said spectrum of overlapping spectra onto said blazed grating disperser, said first collimating lens and said second collimating lens having minimal spherical aberrations, thereby achieving a steep bandpass profile and decreasing crosstalk between said spectral channels.

15. The spectrometer according to claim 14, wherein said spectrometer is an imaging spectrometer further including a scan mirror and a telescope, whereby said radiant energy is reflected from said scan mirror, passed through said telescope and directed toward said first collimating lens.

16. The spectrometer according to claim 13, wherein said radiant energy is UV light.

17. The spectrometer according to claim 13, wherein said radiant energy is IR light.

18. The spectrometer according to claim 13, wherein said radiant energy is visible light.

19. A spectrometer for detecting radiant energy, comprising:
   a scan mirror for receiving radiant energy from a target area;
   a telescope assembly for directing the radiant energy reflected off said scan mirror along an optical path;
   a first collimator for collimating the radiant energy directed throughout the telescope assembly;
   a blazed echelon that receives the collimated radiant energy received from the first collimator, wherein said blazed echelon divides the radiant energy into a spectrum of overlapping spectra;
   a single blazed grating disperser that receives said spectrum of overlapping spectra from said blazed echelon and separates the overlapping spectra into discrete spectral channels; and
   a plurality of detecting means for detecting said discrete spectral channels reflected from said single blazed grating disperser, wherein each of said plurality of detecting means is adapted to detect one of said discrete spectral channels, and said single blazed grating disperser directs each of said discrete spectral channels toward the detecting means adapted to detect that spectral channel.

20. The spectrometer according to claim 19 further including an image intensifier means for intensifying said discrete spectral channels.

21. The spectrometer according to claim 19 further including a second collimator for collimating said spectrum of overlapping spectra generated by said blazed echelon.

22. A method of detecting discrete spectral channels contained within radiant energy, comprising the steps of:
   collimating impinging radiant energy;
   directing the collimated radiant energy against a blazed echelon to produce a spectrum of overlapping spectra;
   directing said overlapping spectra against a single blazed grating disperser, wherein said blazed grating disperser separates said overlapping spectra into discrete spectral channels, wherein each of said discrete spectral channels is directed along a separate path; and
   providing a single detection means for each of said discrete spectral channels along each separate path, wherein each of the detecting means detects the radiant energy contained within the discrete spectral channel along that path.

23. The method according to claim 22, further including the step of collimating said spectrum of overlapping spectra prior to the overlapping spectra impinging upon said blazed grating disperser.

24. The method according to claim 22, further including the step of intensifying said discrete spectral channels before said discrete spectral channels are detected by said detection means.

* * * * *